(12) United States Patent
D'Hondt (10) Patent No.: US 11,519,528 B2
(45) Date of Patent: Dec. 6, 2022

(54) EXTREME HIGH-TEMPERATURE RESISTANT MULTILAYERED DIESEL EXHAUST FLUID TUBING

(71) Applicant: GM GLOBAL TECHNOLOGY OPERATIONS LLC, Detroit, MI (US)

(72) Inventor: Dennis M. D'Hondt, Ray, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/082,247

(22) Filed: Oct. 28, 2020

(65) Prior Publication Data
US 2022/0128177 A1 Apr. 28, 2022

(51) Int. Cl.
*F16L 11/115* (2006.01)
*F16L 11/20* (2006.01)
*F01N 3/20* (2006.01)

(52) U.S. Cl.
CPC .......... *F16L 11/115* (2013.01); *F01N 3/2066* (2013.01); *F16L 11/20* (2013.01); *F01N 2610/02* (2013.01); *F01N 2610/1406* (2013.01)

(58) Field of Classification Search
CPC combination set(s) only.
See application file for complete search history.

(56) References Cited

U.S. PATENT DOCUMENTS

| | | | |
|---|---|---|---|
| 2006/0134360 A1* | 6/2006 | Inoue | B32B 27/34 428/36.91 |
| 2007/0148389 A1* | 6/2007 | Nishioka | F02M 37/0017 428/36.91 |
| 2012/0145275 A1* | 6/2012 | Seebold | B32B 25/042 264/209.6 |
| 2013/0273286 A1* | 10/2013 | Luo | B32B 5/026 524/502 |
| 2013/0330065 A1* | 12/2013 | Schwarzkopf | F16L 53/34 392/468 |
| 2019/0330470 A1* | 10/2019 | Yamanaka | F02M 35/10321 |

* cited by examiner

*Primary Examiner* — Binh Q Tran
(74) *Attorney, Agent, or Firm* — Harness, Dickey & Pierce, P.L.C.

(57) ABSTRACT

A tubing to supply diesel exhaust fluid to an exhaust system of a diesel engine includes an inner layer made of a first material and an outer layer made of a second material. The first material includes polyethersulfone polymer or polyphenylene sulfide. The second material includes a polyamide or polyphthalamide. An outer surface of the inner layer and an inner surface of the outer layer include a reactive material that facilitates bonding between the inner layer and the outer layer of the tubing.

13 Claims, 6 Drawing Sheets

EXTREME HIGH-TEMPERATURE RESISTANT MULTILAYERED DIESEL EXHAUST FLUID TUBING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to automotive exhaust systems and more particularly to extreme high-temperature resistant multilayered diesel exhaust fluid tubing.

In vehicles powered by diesel engines, exhaust gases from the diesel engines include nitrogen oxide (NO and $NO_2$, collectively NOx) gases. Selective catalytic reduction (SCR) systems are used to reduce NOx emissions. Additionally, diesel exhaust fluid (DEF), which includes water and urea, is injected into the exhaust gases. The DEF converts the NOx gases into nitrogen and water, which are released into the environment.

SUMMARY

A tubing to supply diesel exhaust fluid to an exhaust system of a diesel engine comprises an inner layer made of a first material and an outer layer made of a second material. The first material includes polyethersulfone polymer or polyphenylene sulfide. The second material includes a polyamide or polyphthalamide. An outer surface of the inner layer and an inner surface of the outer layer include a reactive material that facilitates bonding between the inner layer and the outer layer of the tubing.

In another feature, the reactive material facilitates bonding between the inner layer and the outer layer of the tubing without an adhesive.

In another feature, the tubing further comprises an adhesive layer between the inner layer and the outer layer of the tubing.

In another feature, the reactive material facilitates bonding between the adhesive layer and the inner and outer layers.

In another feature, the polyamide includes PA6.10 or PA9T.

In other features, the tubing is proximate to a component of the exhaust system, wherein heat from the component generates ammonia gas in the tubing from the diesel exhaust fluid. The ammonia gas superheats in the tubing when no residual diesel exhaust fluid remains in the tubing.

In other features, the tubing further comprises a first connector connecting a first end of the tubing to a reservoir supplying the diesel exhaust fluid, and a second connector connecting a second end of the tubing to a component of the exhaust system. The first and second connectors are made of polyphthalamide or polyphenylene sulfide.

In still other features, a tubing to supply diesel exhaust fluid to an exhaust system of a diesel engine comprises an inner layer made of a first material and an outer layer made of a second material. The first material includes polyethersulfone polymer or polyphenylene sulfide. The second material includes a polyamide or polyphthalamide.

In another feature, an outer surface of the inner layer and an inner surface of the outer layer include a non-adhesive material that facilitates bonding between the inner layer and the outer layer without an adhesive.

In another feature, the tubing further comprises an adhesive layer between the inner layer and the outer layer of the tubing.

In another feature, an outer surface of the inner layer and an inner surface of the outer layer include a material that facilitates bonding between the adhesive layer and the inner and outer layers.

In another feature, the polyamide includes PA6.10 or PA9T.

In another feature, the tubing is proximate to a component of the exhaust system, wherein heat from the component generates ammonia gas in the tubing from the diesel exhaust fluid. The ammonia gas superheats in the tubing when no residual diesel exhaust fluid remains in the tubing.

In other features, the tubing further comprises a first connector connecting a first end of the tubing to a reservoir supplying the diesel exhaust fluid, and a second connector connecting a second end of the tubing to a component of the exhaust system. The first and second connectors are made of polyphthalamide or polyphenylene sulfide.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Tubing (or hose) used to supply diesel exhaust fluid (DEF) to exhaust systems (hereinafter called the DEF tubing) of diesel-powered vehicles can experience relatively high temperatures from adjacent components of the exhaust systems. The high temperatures can boil residual DEF in the DEF tubing, which generates ammonia gas. As long as some residual DEF remains in liquid state in the DEF tubing, the ammonia gas does not reach a temperature at which it becomes chemically aggressive and damages the DEF tubing. If the heat flux transmitted through the walls of the DEF tubing boils all of the residual DEF in the DEF tubing (i.e., if no residual DEF remains in liquid state in the DEF tubing), the ammonia gas becomes superheated and chemically aggressive. Both internal and external surfaces of the DEF tubing can degrade and become brittle if high temperature-resistant materials are not used to construct the DEF tubing and if an inner layer of the DEF tubing does not include material that is resistant to chemical attack by the superheated ammonia gas.

To combat the chemical attack by the superheated ammonia gas, materials such as fluorocarbon polymers and fluoroelastomers are typically used as the inner liner of the DEF tubing. However, fluorocarbon polymers are expensive, and fluoroelastomers increase the weight of the DEF tubing.

The present disclosure provides DEF tubing made of materials that are less expensive than fluorocarbon polymers and that are resistant to heat and chemical attack by the superheated ammonia gas. Specifically, the DEF tubing according to the present disclosure includes two or three layers. An inner layer or liner (also called a first layer) of the DEF tubing can include polyethersulfone polymer (PES) or polyphenylene sulfide (PPS) that has high temperature and chemical resistance. An outer layer (also called a second layer) of the DEF tubing can include a polyamide (e.g., PA6.10, PA9T) or polyphthalamide (PPA). A layer of adhesive (also called a third layer or an adhesive layer) may or may not be used to bond the inner layer to the outer layer of the DEF tubing. The adhesive layer may be used as an option depending on the material grades and process used to manufacture the DEF tubing.

Further, the outer surface of the inner layer and the inner surface of the outer layer of the DEF tubing can include additives that help in bonding the outer surface of the inner layer to the inner surface of the outer layer of the DEF tubing with or without the adhesive layer. For example, these additives, which are not adhesives, may include chemically reactive substances such as compounds with double bonds. These additives bond the outer surface of the inner layer to the inner surface of the outer layer of the DEF tubing when subjected to high temperatures and/or high pressures during manufacturing of the DEF tubing. When the adhesive layer is used, these additives bond the adhesive layer to the outer surface of the inner layer and to the inner surface of the outer layer of the DEF tubing when subjected to high temperatures and/or high pressures during manufacturing of the DEF tubing. These and other features of the present disclosure are described below in detail.

Figure 1:
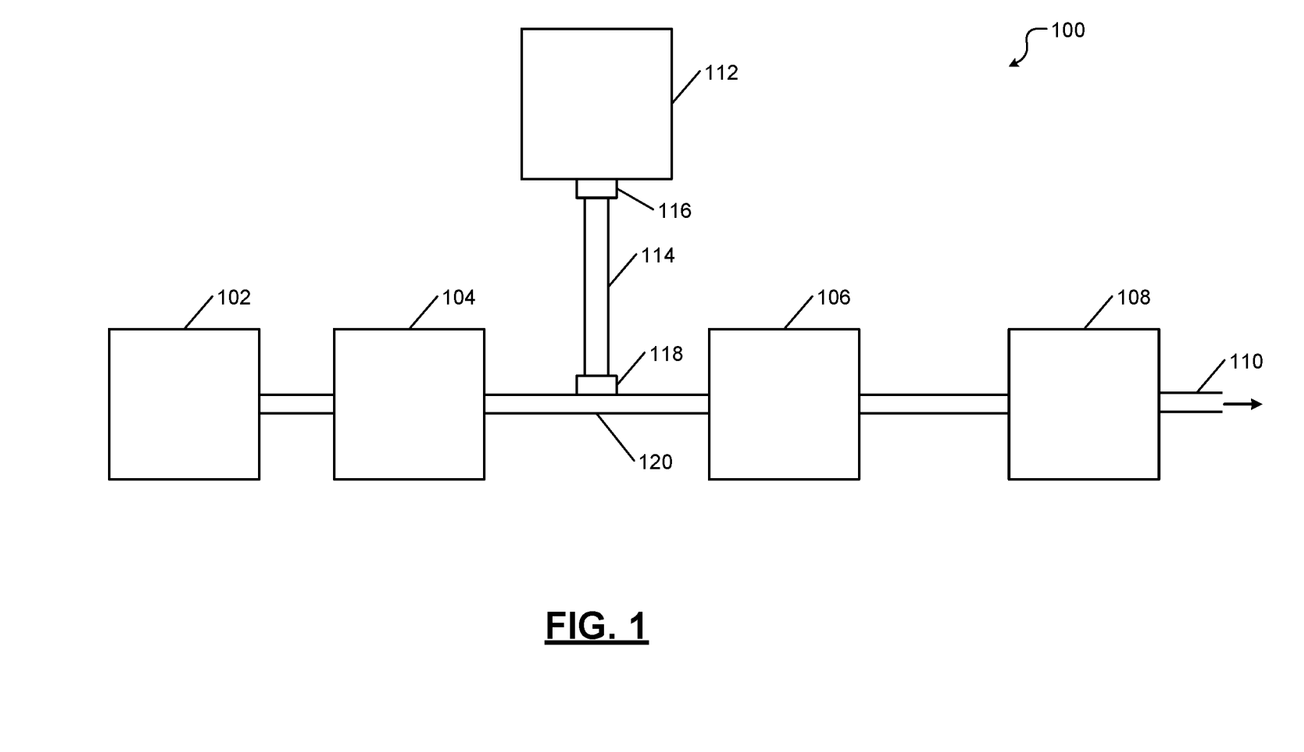
FIG. 1 shows a functional block diagram of an example of an exhaust system of a diesel engine.

FIG. 1 shows an example of an exhaust system 100 including a diesel engine 102. The exhaust system 100 comprises a diesel particulate filter (DPF) 104, a selective catalytic reduction (SCR) system 106, a muffler 108, and a tail pipe 110. The diesel engine 102 combusts diesel and generates exhaust gases. The DPF 104 removes particulate matter from the exhaust gases. The SCR system 106 reduces NOx gases from the exhaust gases.

Additionally, the exhaust system 100 comprises a DEF supply or reservoir 112 that supplies the DEF through a DEF tubing 114. A first end of the DEF tubing 114 is connected to the DEF supply 112 by a first connector 116. A second end of the DEF tubing 114 is connected to an exhaust pipe 120 of the exhaust system 100 (e.g., upstream from the SCR system 106) by a second connector 118. The first and second connectors 112, 118 are also made of polyphthalamide (PPA), polyphenylene sulfide (PPS), or other suitable material having a relatively high temperature resistance.

The DEF from the DEF supply 112 is injected into a component of the exhaust system 100 in a controlled manner. For example, the DEF from the DEF supply 112 is injected through the DEF tubing 114 into the exhaust pipe 120. Alternatively, the DEF may be injected through the DEF tubing 114 directly into the SCR system 106. The DEF injected into the exhaust system 100 converts the NOx gases in the exhaust gases into nitrogen and water. The nitrogen and water are released into the environment through the muffler 108 and the tail pipe 110.

FIGS. 2-4B show various cross-sectional views of the DEF tubing 114 according to the present disclosure. In FIGS. 2-4B, elements of the DEF tubing shown are not to scale. For example, diameters and thicknesses of the elements and distances between the elements are magnified for illustrative purposes. Further, the shape of the DEF tubing 114 is shown as being cylindrical for example only. The DEF tubing 114 and its elements described below can be of any other geometric shapes and can have various dimensions.

Figure 2:
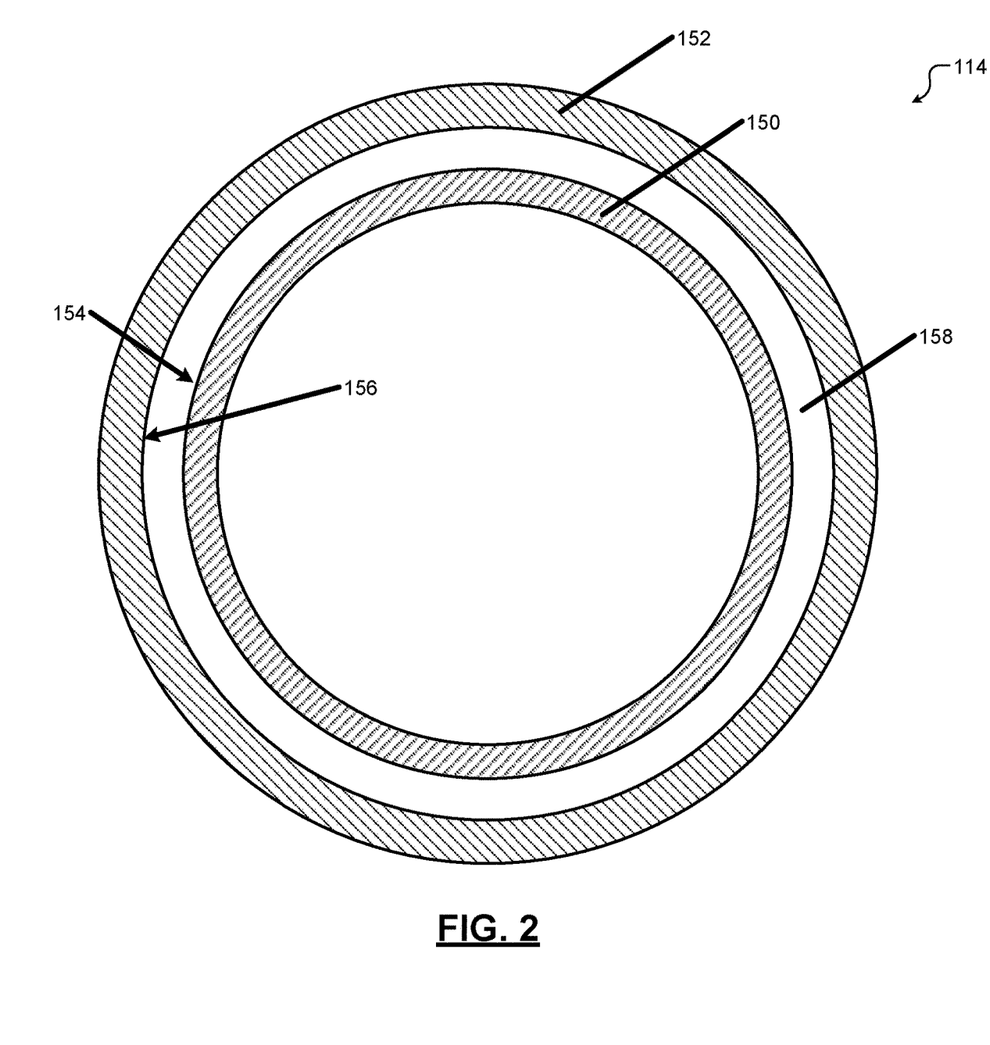
FIG. 2 shows a cross-sectional view of a diesel exhaust fluid (DEF) tubing used with the exhaust system according to the present disclosure.

In FIG. 2, the DEF tubing 114 includes an inner layer (also called a first layer throughout the present disclosure) 150 and an outer layer (also called a second layer throughout the present disclosure) 152. An outer surface 154 of the inner layer 150 and an inner surface 156 of the outer layer 152 include the reactive additives described above, which are shown and described below with reference to FIGS. 3A and 3B. Additionally, the DEF tubing 114 may optionally include an adhesive layer (also called a third layer throughout the present disclosure) 158, which is shown and described below with reference to FIGS. 4A and 4B.

As described above, the inner layer 150 of the DEF tubing 114 can include polyethersulfone polymer (PES) or polyphenylene sulfide (PPS) that has high temperature and chemical resistance. The outer layer 152 of the DEF tubing 114 can include a polyamide (e.g., PA6.10, PA9T) or polyphthalamide (PPA). Preferably, the inner layer 150 of the DEF tubing 114 is made of PPS, and the outer layer 152 of the DEF tubing 114 is made of PA6.10 or PA9T. The DEF tubing 114 is manufactured using extrusion process. The adhesive layer 158 may also include a material having a relatively high temperature resistance.

Figure 3A:
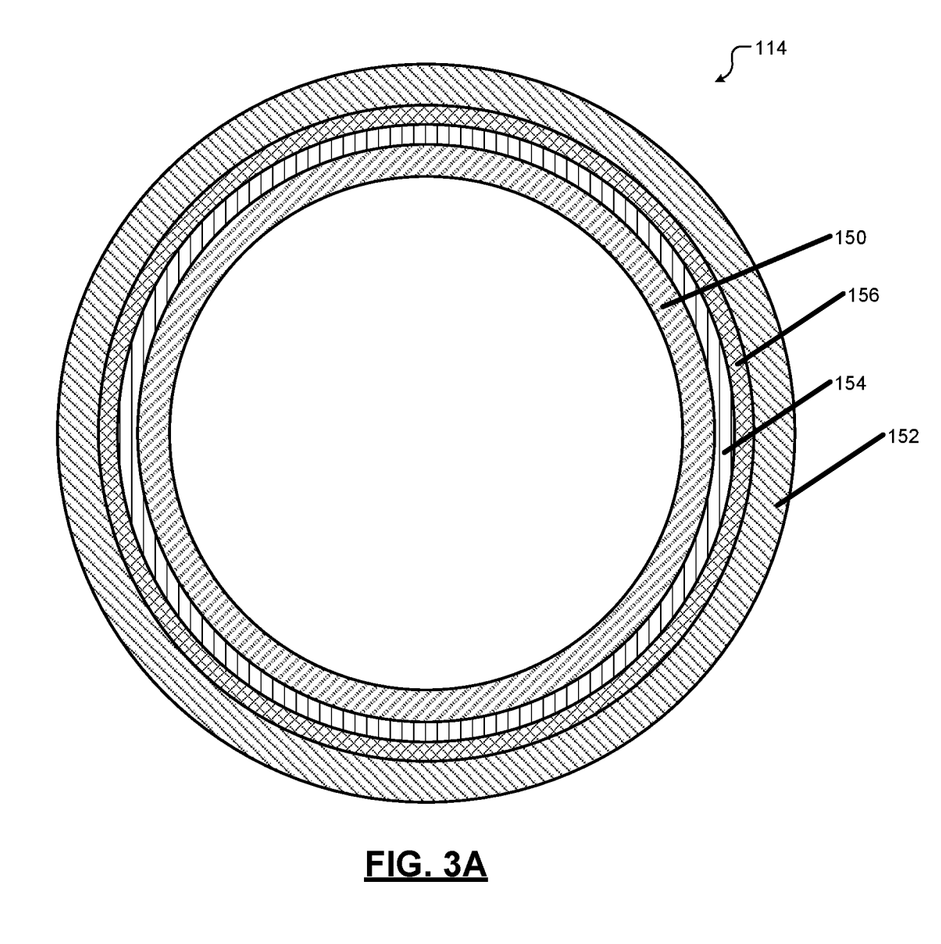
FIGS. 3A and 3B show cross-sectional views of the DEF tubing without an adhesive layer according to the present disclosure.
Figure 3B:
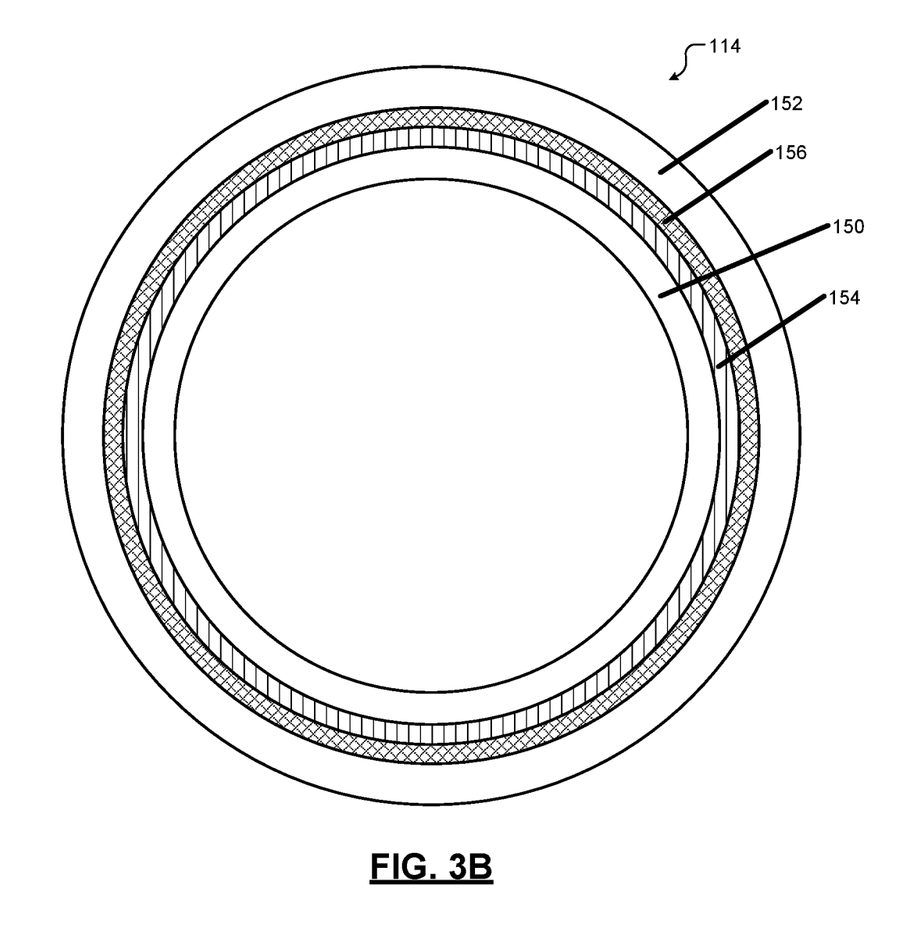

FIGS. 3A and 3B show cross-sectional views of the DEF tubing 114 without the adhesive layer according to the present disclosure. FIG. 3A shows the outer surface 154 of the inner layer 150 and the inner surface 156 of the outer layer 152. FIG. 3B shows the outer and inner surfaces 154, 156 by de-emphasizing the inner and outer layers 150, 152 for illustrative purposes. The outer surface 154 of the inner layer 150 and the inner surface 156 of the outer layer 152 include the reactive additives (e.g., compounds with double bonds) described above.

Note that the outer and inner surfaces 154, 156 are shown in the form of layers or coatings of the reactive additives on the inner and outer layers 150, 152 for illustrative purposes only. That is, the outer and inner surfaces 154, 156 can be in the form of layers or coatings of the reactive additives on the inner and outer layers 150, 152 of the DEF tubing 114. Alternatively, the reactive additives can be built into the inner and outer layers 150, 152, preferably proximate to the outer and inner surfaces 154, 156, during the manufacturing of the inner and outer layers 150, 152. Accordingly, the inner and outer layers 150, 152 may be manufactured with the reactive additives either coated on the outer and inner surfaces 154, 156, or embedded in the outer and inner surfaces 154, 156.

Figure 4A:
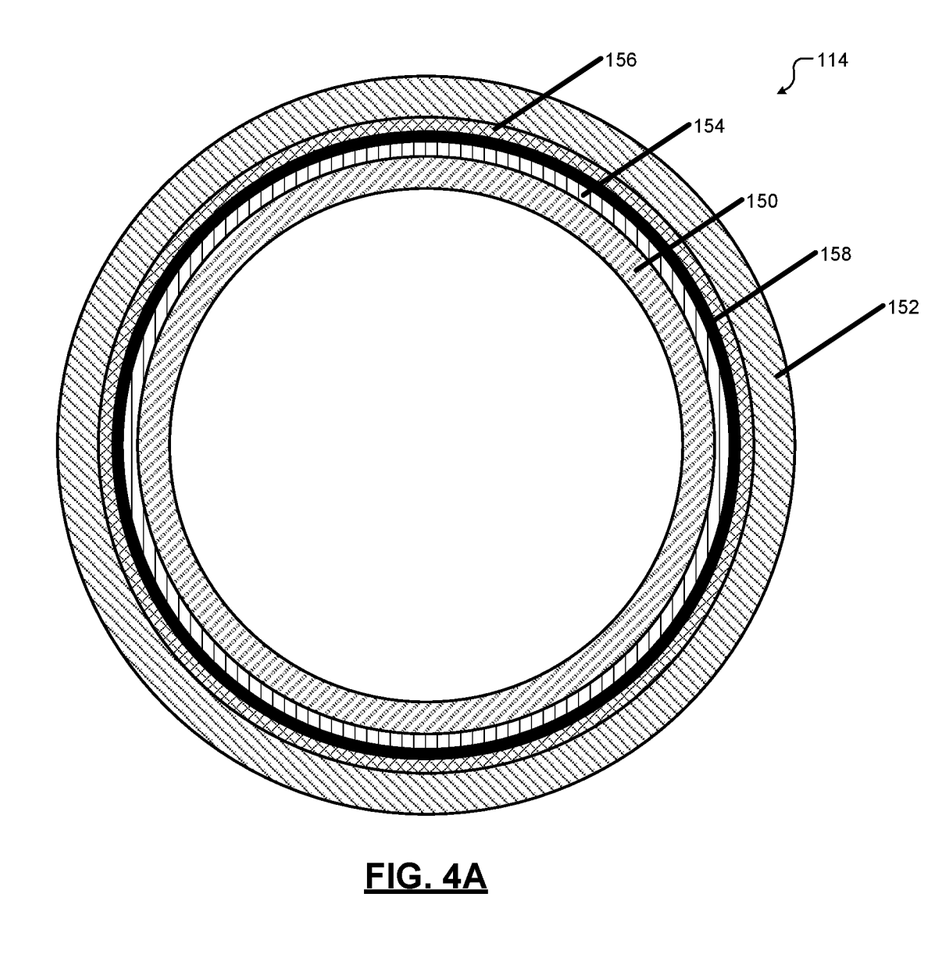
FIGS. 4A and 4B show cross-sectional views of the DEF tubing with the adhesive layer according to the present disclosure.
Figure 4B:
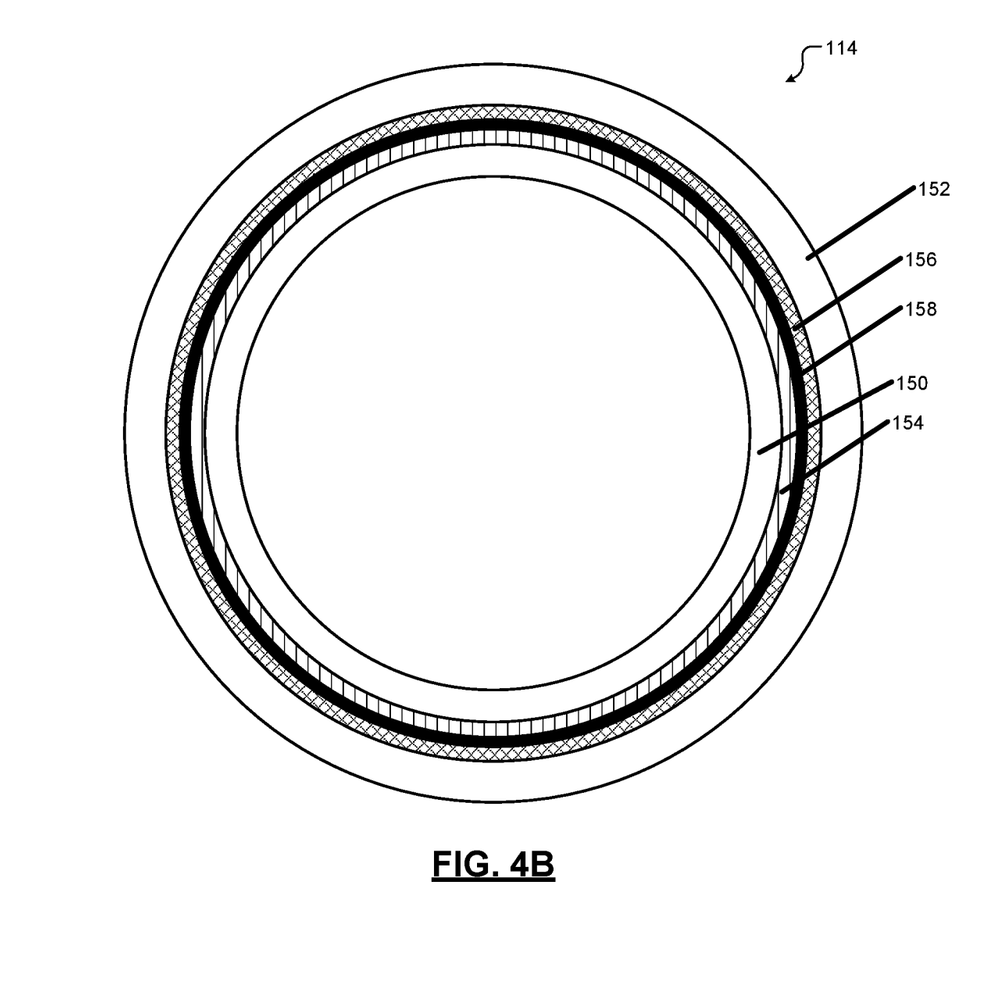

FIGS. 4A and 4B show cross-sectional views of the DEF tubing 114 with the adhesive layer according to the present disclosure. FIG. 4A shows the adhesive layer 158 disposed between the outer surface 154 of the inner layer 150 and the inner surface 156 of the outer layer 152. FIG. 4B shows the adhesive layer 158 and the outer and inner surfaces 154, 156 by de-emphasizing the inner and outer layers 150, 152 for illustrative purposes. As described above, the reactive additives in the outer and inner surfaces 154, 156 of the inner and outer layers 150, 152, whether coated on or embedded in the inner and outer layers 150, 152, help in bonding the adhesive layer 158 to the outer and inner surfaces 154, 156 of the inner and outer layers 150, 152.

Due to the proximity of the DEF tubing 114 to the components of the exhaust system 100 (e.g., the diesel engine 102, the DPF 104, the exhaust pipe 120, the SCR system 106, the muffler 108, etc.), the DEF tubing 114 experiences heat from the components of the exhaust system 100. Ammonia gas is generated in the DEF tubing 114 from the diesel exhaust fluid due to the heat experienced by the DEF tubing 114 from the components of the exhaust system 100. The ammonia gas superheats in the DEF tubing 114 when no residual diesel exhaust fluid remains in the DEF tubing 114.

However, due to the structure of the DEF tubing 114 and due to the materials used to manufacture the DEF tubing 114 as described above with reference to FIGS. 2-4A, the DEF tubing 114 can withstand the relatively high temperatures and the chemical attack of the superheated ammonia gas. Accordingly, the life of the DEF tubing 114 is extended. Further, due to the materials used to manufacture the DEF tubing 114, the DEF tubing 114 is relatively inexpensive compared to other designs.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A tubing to supply diesel exhaust fluid to an exhaust system of a diesel engine, the tubing comprising:
    an inner layer made of a first material, wherein the first material includes polyethersulfone polymer or polyphenylene sulfide; and
    an outer layer made of a second material, wherein the second material includes a polyamide or polyphthalamide,
    wherein an outer surface of the inner layer and an inner surface of the outer layer include an inbuilt chemically reactive substance that facilitates bonding between the inner layer and the outer layer of the tubing.

2. The tubing of claim 1 wherein the reactive material facilitates bonding between the inner layer and the outer layer of the tubing without an adhesive.

3. The tubing of claim 1 further comprising an adhesive layer between the inner layer and the outer layer of the tubing.

4. The tubing of claim 3 wherein the reactive material facilitates bonding between the adhesive layer and the inner and outer layers.

5. The tubing of claim 1 wherein the polyamide includes PA6.10 or PA9T.

6. The tubing of claim 1 wherein:
    the tubing is proximate to a component of the exhaust system, wherein heat from the component generates ammonia gas in the tubing from the diesel exhaust fluid; and
    the ammonia gas superheats in the tubing when no residual diesel exhaust fluid remains in the tubing.

7. The tubing of claim 1 further comprising:
    a first connector connecting a first end of the tubing to a reservoir supplying the diesel exhaust fluid; and
    a second connector connecting a second end of the tubing to a component of the exhaust system,
    wherein the first and second connectors are made of polyphthalamide or polyphenylene sulfide.

8. A tubing to supply diesel exhaust fluid to an exhaust system of a diesel engine, the tubing comprising:
    an inner layer made of a first material, wherein the first material includes polyethersulfone polymer or polyphenylene sulfide; and
    an outer layer made of a second material, wherein the second material includes a polyamide or polyphthalamide,
    wherein an outer surface of the inner layer and an inner surface of the outer layer include an inbuilt non-adhesive material that facilitates bonding between the inner layer and the outer layer without an adhesive.

9. The tubing of claim 8 further comprising an adhesive layer between the inner layer and the outer layer of the tubing.

10. The tubing of claim 9 wherein an outer surface of the inner layer and an inner surface of the outer layer include a material that facilitates bonding between the adhesive layer and the inner and outer layers.

11. The tubing of claim 8 wherein the polyamide includes PA6.10 or PA9T.

12. The tubing of claim 8 wherein:

the tubing is proximate to a component of the exhaust system, wherein heat from the component generates ammonia gas in the tubing from the diesel exhaust fluid; and the ammonia gas superheats in the tubing when no residual diesel exhaust fluid remains in the tubing.

13. The tubing of claim 8 further comprising:

a first connector connecting a first end of the tubing to a reservoir supplying the diesel exhaust fluid; and a second connector connecting a second end of the tubing to a component of the exhaust system, wherein the first and second connectors are made of polyphthalamide or polyphenylene sulfide.

\* \* \* \* \*